United States Patent [19]

Jopson

[11] 4,395,844

[45] Aug. 2, 1983

[54] DEVICE TO SUPPORT FLEXIBLE NETTING USED TO PROTECT PLANTS FROM DAMAGE BY ANIMALS AND ADVERSE ENVIRONMENTAL CONDITIONS

[75] Inventor: Tom Jopson, Covelo, Calif.

[73] Assignee: Fortech, Covelo, Calif.

[21] Appl. No.: 307,346

[22] Filed: Sep. 30, 1981

[51] Int. Cl.³ .............................................. A01G 13/10
[52] U.S. Cl. ........................................... 47/31; 47/23
[58] Field of Search ....................................... 47/26–31, 47/47, 23; 40/10 C

[56] References Cited

U.S. PATENT DOCUMENTS

| | | | |
|---|---|---|---|
| 1,113,485 | 10/1914 | Resh | 47/28 |
| 2,048,906 | 7/1936 | Webster | 40/10 C |
| 2,269,087 | 1/1942 | Schramm | 40/10 C |
| 3,816,959 | 6/1974 | Nalle | 47/31 X |

FOREIGN PATENT DOCUMENTS

| | | | |
|---|---|---|---|
| 2643254 | 3/1978 | Fed. Rep. of Germany. | |
| 1444605 | 5/1966 | France | 47/29 |
| 1913 | of 1885 | United Kingdom | 40/10 C |
| 12780 | 4/1928 | United Kingdom | 47/28 |
| 606245 | 8/1948 | United Kingdom | 47/29 |

Primary Examiner—Robert E. Bagwill
Attorney, Agent, or Firm—Lawrence I. Field

[57] ABSTRACT

A device to support flexible netting used to protect plants, especially seedlings, from browsing wildlife which comprises a metal or plastic wicket having two legs which are inserted in the ground and which is shaped to define a space within which the plant is shielded by the netting when the netting is disposed around and supported by the wicket.

10 Claims, 7 Drawing Figures

GROWTH SPACE

DEVICE TO SUPPORT FLEXIBLE NETTING USED TO PROTECT PLANTS FROM DAMAGE BY ANIMALS AND ADVERSE ENVIRONMENTAL CONDITIONS

This invention relates to the protection of newly planted seedlings and other small plants from damage by browsing deer or other foraging animals such as elk, beaver, rabbits, cattle and rodents.

PRIOR ART

The United States Department of Agriculture Forest Service has published a record of two projects on this subject, entitled "Survey of Current Methods for Seedlings Protection" (July 1972) and "Plastic Tubes for Protecting Seedlings from Browsing Wildlife" (July 1979). The disclosures in these project reports are believed to accurately reflect the "state of the art" and are incorporated herein by this reference.

Another disclosure of a guard for protecting young trees, plants and flowers is that in U.S. Pat. No. 3,816,959 issued June 18, 1974 to George S. Nalle, Jr., which also describes various prior art efforts to solve the same problem.

Other prior art protection methods which have been used include the following:

Flexible plastic nettings stretched over a seedling or young plant with no other support, in which the netting may be placed over a plant by hand or by means of an applicator. This method is not effective because the netting presently offered for this purpose is not rigid and hence does not provide protection above the plant for the growing leader where protection is most needed. The netting cannot be used with very young plant stock which is not strong enough to support the flexible netting in an upright position.

As described in Nalle U.S. Pat. No. 3,816,959 and in the USDA publications, rigid plastic mesh tubes have been used in combination with various kinds of metal, wood or plastic supports. Rigid mesh tubes are more expensive than flexible mesh tubes and are less adaptable to various plant configurations and sizes.

Paper caps have been used to cover the leader but these are readily dislodged by winds or by animals and are not considered sufficiently permanent to be widely used.

THE INVENTION

The present invention is directed to the use of flexible plastic netting of polypropylene or polypropylene/polyethylene compositions, currently available from duPont under the trademark VEXAR ®, which is presently commercially available in 2000 and 7000 yard rolls and is directed to the use of such netting in combination with a novel support.

One object of the invention is to provide a new and improved support for such flexible netting to position it over small trees or shrubs, usually less than three feet tall so that the plant is protected from browsing animals during its early growth and so that the leader may grow freely within the protective netting.

Another object of the invention is to provide a suitable support for a netting which is inexpensive and is easy to install either in a nursery or at some other convenient location such as at a factory or at a supply truck or at the site of use in the area being reforested, revegetated or landscaped.

Still a further object is to provide a support which permits the plant being protected to grow freely without interference while maintaining the protection from browsing animals and rodents.

A further object is to provide an improved support for the netting whereby the netting is less susceptible to being knocked over by browsing animals than unsupported netting and netting supported by other prior art support devices.

Another object of the invention is to provide a support which can be used to position the netting at heights where it is effective either against rodents and/or browsing animals such as rabbits, deer or elk, or against both sources of damage.

Still another object is to provide a support such that the plant to be protected, and the support and the netting can all be "planted" at one time.

A further object is to provide a support which can nest with other supports for easy storage. This nesting also makes it possible to place netting with supports over trees at the nursery or some central location then transport them to the planting site, where support, netting and tree may be planted at one time.

These and other objects will become apparent from the description which follows taken in combination with the drawings in which.

Figure 1:
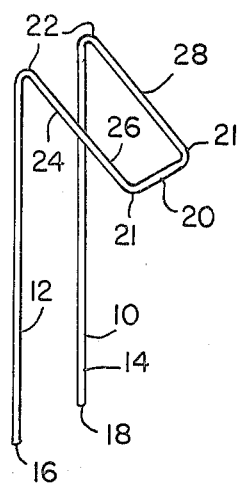
FIG. 1 is a view in perspective of one version of a support according to this invention.

As seen in FIG. 1, the wicket shaped support 10 is formed from a piece of wire rod. It has two legs 12, 14 with free ends 16 and 18 respectively and which are joined across their upper extremities 21 by a short length of rod 20. Between cross piece 20 and the free ends 16, 18 of legs 12 and 14, the legs are bent at 22 to form an angle 24. When a tube of flexible netting is pulled down around the bent wicket of FIG. 1, horizontal cross piece 20 and the segments 26, 28 of legs 12 and 14 adjacent to cross piece 20 define a space in which the plant is protected by means of the netting pulled down around the support. As shown in other figures the netting may be attached to the support 10 by clips or by other suitable means which may be part of the support. Support 10 may be manufactured from a flat wicket by bending the same to form angle 24 or it may be formed from a length of wire by bending the same at 21 to form a wicket and then bending the wicket to the shape shown in FIG. 1.

Figure 2:
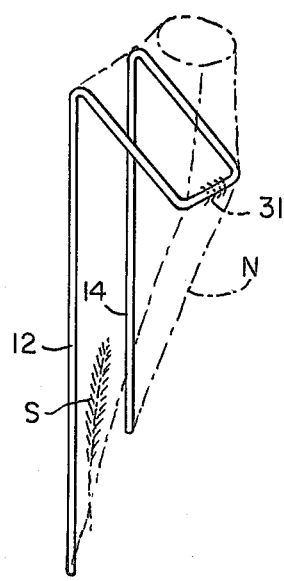
FIG. 2 is a similar view of a modification of the support of FIG. 1, showing the netting and plant in broken lines.

In the modification shown in FIG. 2, legs 12 and 14 are of unequal length while in FIG. 1 they are of equal length. FIG. 2 also shows in phantom a seedling S and netting N positioned around the support 10. A clip or protruberence 31 may be present on cross piece 20 for purposes of fastening netting N to the support 10.

Figure 3:
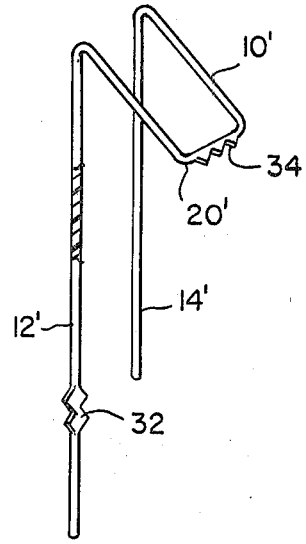
FIG. 3 is a front elevation of still another modification of the device.

In the modification shown in FIG. 3 the support is made of synthetic polymer and the legs 12' and 14' and/or the cross piece 20' are provided with protrusions or ribs 32, 34 which keep the netting N in place once it has been installed on the support 10.

The several modifications of support 10 permit the netting 30 to be stretched over the support and fastened to it, either at some central location (at the factory, in the nursery, or at the supply truck,) or at the site of use.

The assembled units of support 10 and netting N may be put in place over a plant in various ways. For example:

1. They may be put in place with the plant to be protected. With this installation method, the plant and device with netting are "planted" in one operation. The legs 12, 14 of support 10 are inserted into the ground preferably to the depth of the plant roots; the bottom of the netting is buried in the ground an inch or more and held by packing earth around it; or 2. The support 10 and netting N may be put in place in the field on plants already in the ground. The support, with the netting attached, is driven into the ground around the plant to be protected; or 3. The support 10 is inserted first and then the netting N is placed over the plant to be protected.

In any of the above the netting may be clipped to the support at one or more places or it may be pinned to the ground by means of a wire pin.

The devices shown in FIGS. 1–3 will preferably have the following dimensions (length and thickness) depending on the intended applications:

When supports 10 are made of metal wire, the wire gauges preferably range from 9 ga. to 14 ga. The wire may be "roughened" at suitable locations, particularly on cross piece 20, to help prevent netting slippage, e.g. as shown in FIG. 2 at 31.

When supports 10 are made of plastic, the plastic dimensions are such that the support has sufficient give to allow displacement of the device by animals or snow, but the device is sufficiently stiff that it will return to its original, vertical position when the animal or snow ceases to push it. When the supports are made of plastic, support protrusions 32 and/or 34 are molded into them to better hold the netting in place.

Typical lengths for support are as follows:
Vertical legs 12, 14 6" to 36"
Horizontal Crossbar 20 1" to 4"
Angled Support 26, 28 2" to 5".

The angle 24 will range from 40° to 90° from vertical and may extend either downwardly or upwardly or may even be horizontal (90°).

Figure 6:
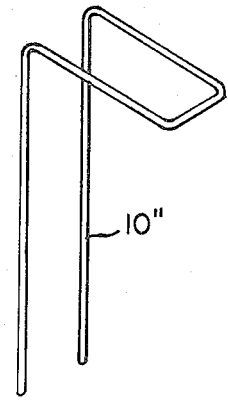
FIGS. 6 and 7 show further modifications of the support of FIG. 1.
Figure 7:
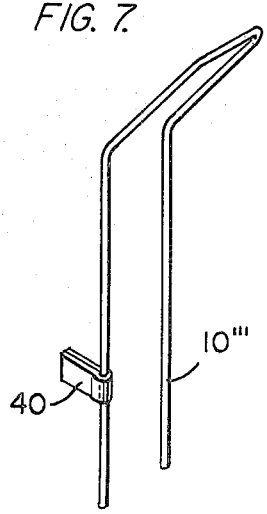

FIGS. 6 and 7 show modifications in which angle 24 is 90° (FIG. 6) and is an obtuse angle (FIG. 7). FIG. 7 also shows a clip 40 by means of which the support may secure the netting N either within the ground or above ground level.

Figure 4:
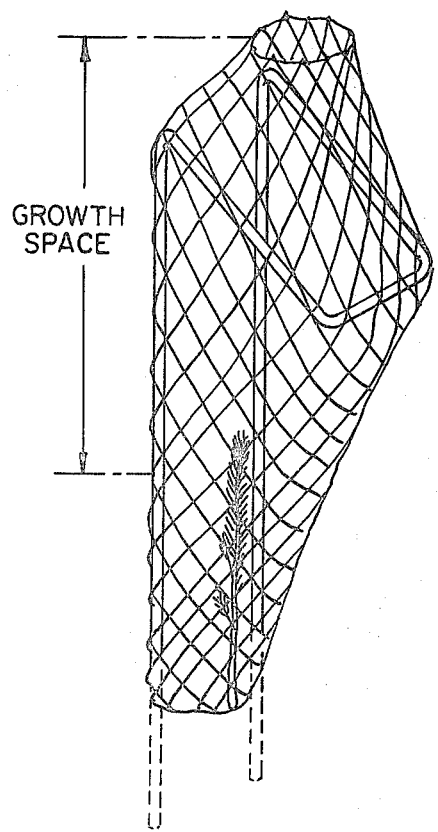
FIG. 4 shows the support and flexible netting disposed about a seedling.

FIG. 4 is an enlarged view in perspective showing the support and netting disposed around a plant and illustrating the provision for growth of the plant leader within a protective space.

Figure 5:
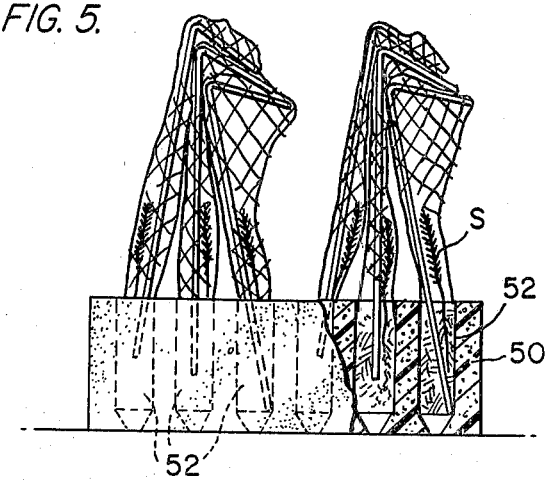
FIG. 5 is a view showing nesting of the supports in a tray containing a number of seedlings to be planted.

FIG. 5 is a view showing a transplanting container 50 having pockets 52 for plants or seedlings S, and showing supports 10 inserted into the pockets with netting N.

The carrier 50 is adapted to be prepared at a nursery for transportation to the field site where the transplantings are to take place. Whether netting N is placed around supports 10 at the nursery is optional. In either mode the supports readily nest as shown in FIG. 5, by virtue of angle 24.

It will be seen a device has been provided for the protection of plants from browsing animals or rodents which as compared to other known methods is inexpensive to manufacture and to ship (because it nests) and which is adapted to be used with a wide range of plant sizes and netting types and which can be installed either in the nursery or in the field.

Having now described preferred embodiments of my invention it is not intended that it be limited except as may be required by the claims which follow:

1. Means for protecting a growing plant from damage by browsing animals and rodents which comprises:

a wicket having two legs adapted to be inserted into the ground on opposite sides of the plant to be protected and having a cross bar connecting said two legs, each of said legs consisting of a straight vertical portion with a free and adapted to be inserted vertically into the ground and an inclined portion extending between said cross piece and said vertical portion and formed by bending the legs between their free end and the cross piece, said legs being spaced a sufficient distance from one another to define, with said crosspiece a growth space which permits unimpeded growth of the plant;

a tube of flexible plastic netting pulled down around said wicket and having its lower end at the level of the ground and extending upwardly a sufficient height above the bent portion of said wicket to afford protection to the leader of said growing plant whereby the growing plant is protected by the lower end of said netting from damage by rodents and from damage by browsing animals by the upwardly extending netting;

said wicket serving to maintain said net with a tubular shape to permit said leader to grow freely.

2. The means of claim 1 wherein the lowermost portion of the tube of plastic netting is buried in the ground at its lower end.

3. The support of claim 1 wherein the two legs are of equal length.

4. The support of claim 1 wherein the two legs are of unequal length.

5. The support of claim 1 including attachment means on said support for securing said netting to said support.

6. The support of claim 5 wherein the attachment means are integral with said support.

7. The support of claim 5 wherein the attachment means comprise at least one clip secured to said support.

8. The support of claim 1 formed of metal rod.

9. The support of claim 1 formed of synthetic resin.

10. The support of claim 1 wherein the legs are bent to form an acute angle.

* * * * *